United States Patent [19]

Miura et al.

[11] Patent Number: 4,570,215

[45] Date of Patent: Feb. 11, 1986

[54] INPUT/OUTPUT DEVICE FOR PROGRAMMABLE CONTROLLER

[75] Inventors: Masatsugu Miura, Kyoto; Takao Ohta; Kiyoto Hirase, both of Nagaokakyo; Seitoro Iwahashi, Kyoto, all of Japan

[73] Assignee: Omron Tateisi Electronics Co., Kyoto, Japan

[21] Appl. No.: 456,000

[22] Filed: Jan. 6, 1983

[30] Foreign Application Priority Data

Jan. 8, 1982 [JP] Japan .................................. 57-1407
Feb. 17, 1982 [JP] Japan ................................ 57-24147

[51] Int. Cl.⁴ .............................................. G06F 9/00
[52] U.S. Cl. ..................................... 364/140; 364/900
[58] Field of Search ............................... 364/140–147, 364/200, 900

[56] References Cited

U.S. PATENT DOCUMENTS

| 4,228,495 | 10/1980 | Bernhard et al. | 364/200 |
| 4,314,334 | 2/1982 | Daughton et al. | 364/200 |
| 4,319,338 | 3/1982 | Grudowski et al. | 364/900 |
| 4,354,226 | 10/1982 | Flickinger et al. | 364/900 X |

Primary Examiner—Joseph Ruggiero
Attorney, Agent, or Firm—Cushman, Darby & Cushman

[57] ABSTRACT

An input/output device for a programmable controller provided separately from said device capable of performing the bidirectional transmission such as taking in the input data and sending out the output data only by connecting the main unit of said controller to said input-/output device or devices with two systems of signal line consisting of a serial data conductor and a clock signal conductor.

9 Claims, 10 Drawing Figures

INPUT/OUTPUT DEVICE FOR PROGRAMMABLE CONTROLLER

BACKGROUND OF THE INVENTION

The present invention relates to an input/output device for a programmable controller, and more particulary to an input/output device capable of exchanging the input/output data with the main unit of the controller by means of serial data transmission.

In recent years, relatively large-scale centralized control systems using programmable controllers are frequently employed in control systems for ordinary machine plants. In such a centralized control system, various kinds of input devices such as limit switches, temperature switches, proximity switches, photoelectric switches and various kinds of output devices such as motors, plungers, electromagnetic valves and so forth are respectively connected to the central controller with individual signal conductors in many cases. Where this kind of system has many input/output devices that are dispersedly located in a relatively large space, the wiring space for the connections between the input/output devices and the central controller and the wiring cost have become great problems and, thus, currently it is strongly advantageous to simplify signal transmission by properly applying multiplex transmission.

Various kinds of multiplex transmission systems are conventionally known, which are utilized for the transmission of the input/output data in the programmable controller. However, in the conventional multiplex transmission system, an intrinsic address is assigned to each terminal of the system and circuit for judging the address which is provided at each terminal, but its transmission control procedure including an address-discriminating circuit is very complicated and sophisticated, thereby making this system very expensive. Of course, it can be advantageous to employ such sophisticated circuitry, but the conventional system has many functions not required for transmission of the input/output data in the programmable controller and, thus, as a result is not able to properly respond to the request stated above.

BRIEF SUMMARY OF THE INVENTION

The present invention has been made to solve the problems inherent in the conventional systems described above.

Therefore, it is a primary object of the present invention to provide an input/output device for a programmable controller, which makes the wiring of transmission lines very simple at low cost, by providing the input/output device separately from the main unit of the controller and by making it possible to transmit only by connecting the input/output device to the main unit of the controller with signal conductors comprising two systems, namely a serial data line and clock signal line.

Another object of the present invention is to provide and input/output device for a programmable controller, which has a simple construction and can be easily produced, by only forming the device with a control circuit consisting of only timer circuits and flip-flops without employing a circuit for judging addresses or a control circuit for handling troublesome transmission control procedure.

Another object of the present invention is to provide an input/output device for a programmable controller with excellent flexibility in increasing or decreasing the scale of the system by allowing it to connect in series the input/output device to other input/output devices and to perform transmission of correct input/output data only by letting the main unit of the controller recognize the number of input/output devices being connected.

Another object of the present invention is to provide an input/output device for a programmable controller, which can be produced at a lower cost, by using one-directional registers as shift registers forming the input/output device.

Another object of the present invention is to provide an input/output device for a programmable controller, which is capable of transmitting the input/output data at a minimum transmission time corresponding to the number of input/output devices actually connected, by making it possible to know the number of the input/output devices connected at the main unit side of the controller.

Another object of the present invention is to provide an input/output device for a programmable controller which is able to prevent the controlled equipment from being disturbed and which is easily able to recover an abnormal state in the event of occurence of an abnormal state such as a broken clock signal conductor or trouble in a clock signal sending system of the main unit of the controller.

Another object of the present invention is to provide an input/output device for a programmable controller capable of always performing the data transmission correctly without being affected by a deviation in shift timing due to the dispersion of the clock signal.

Another object of the present invention is to provide an input/output device for a programmable controller capable of preventing any error control operation from being performed by so forming the device that the output data having any parity error detected will not be sent outside.

A further object of the present invention is to provide a highly reliable input/output device for a programmable controller by prohibiting the sending-out of output data as an external output signal resulted from an error transmission when noise has been mixed in the clock signal conductor or the clock signal has not been properly transmitted to the input/output device.

Other and further objects of the present invention will become readily apparent to those skilled in the art upon an understanding of the illustrative embodiments about to be described or will be indicated in the appended claims, and various advantages not referred to herein will occur to those skilled in the art upon employment of the invention in practice.

DETAILED DESCRIPTION OF THE INVENTION

Figure 1:
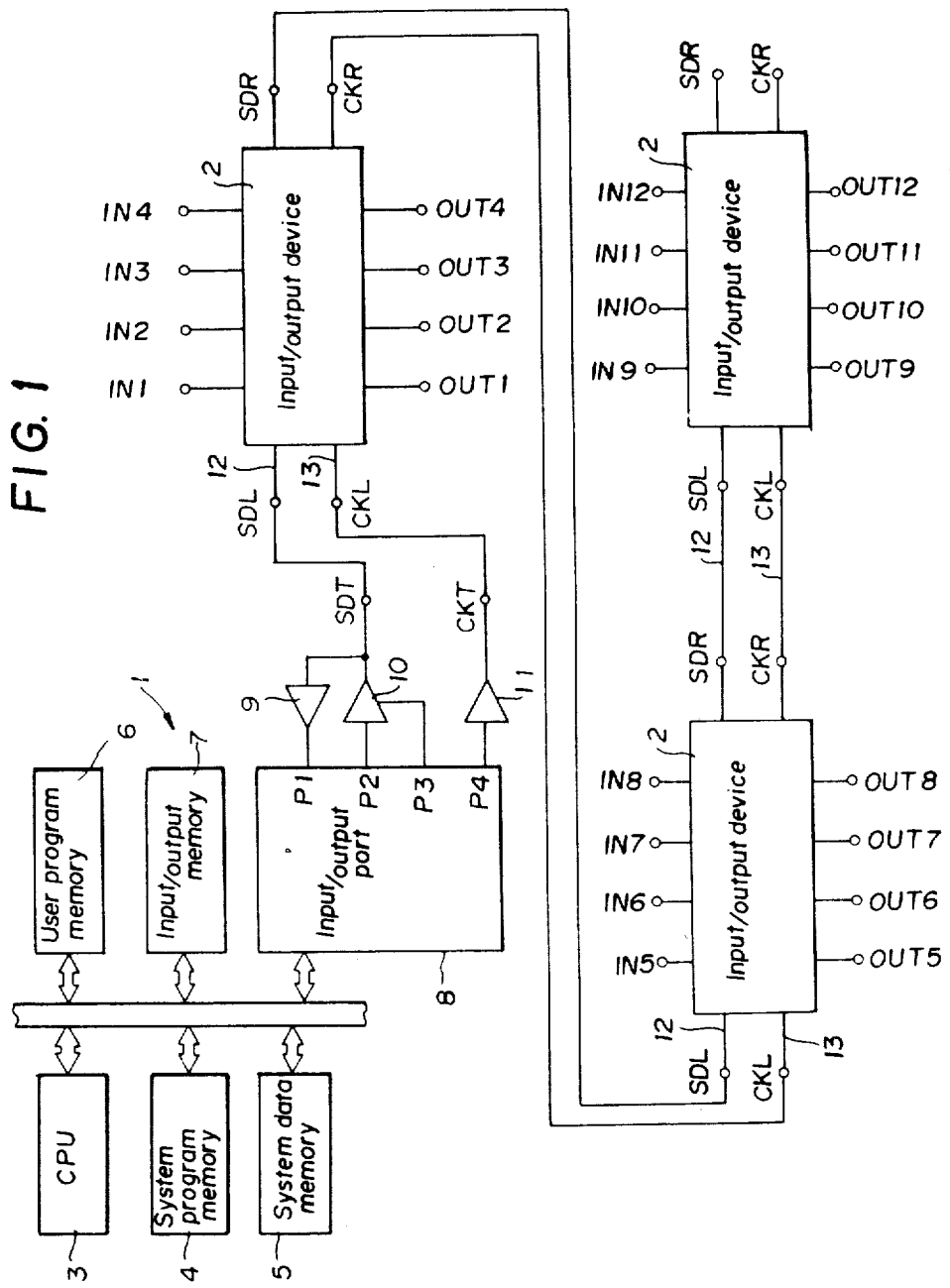
FIG. 1 is a block diagram showing a schematic configuration of a first embodiment of a programmable controller system of the present invention.

FIG. 1 is a block diagram showing a schematic confiiguration of the whole of a programmable controller system of a first embodiment of the present invention. This programmable controller comprises a controller main unit 1 and separately arranged plural input/output devices 2, 2, . . . but these input/output devices of this embodiment have the same configuration. Each input/output device 2 has four input terminals to be connected to various kinds of input devices such as limit switches and four output terminals to be connected to various kinds of output equipment such as motors and plungers. Signals applied to each input terminal are called "external input signals" and individual numbers such as IN1 to IN4, IN5 to IN8, IN9 to IN12 and so forth are given to the signals. In the same manner, the signals sent out from the output terminals of the input/output device 2 are called "external output signals" and individual numbers such as OUT1 to OUT4, OUT5 to OUT8, OUT9 to OUT12 and so forth are given to the signals.

The controller main unit 1 comprises a CPU 3 (central processing unit) functioning as the center of the overall control, a system program memory 4 storing the system program to be executed by CPU 3, a system data memory 5 used by CPU 3 as a temporary storing area for various kinds of variable data, an user program memory 6 storing the sequence control program arbitrarily preset by an user, an input/output memory 7 functioning as buffer memory for input/output data corresponding to the external input/output signals in said input/output device 2, and an input/output port 8 functioning as an interface for giving the output data from the controller main unit 1 to the input/output device 2 and also for taking the input data from the input/output device 2 to the controller main unit 1.

As is well known, in the basic operation for executing the user program in this kind of programmable controller, the user instructions are sequentially read out from the user program memory 6, the input/output data stored in the input/output memory 7 are processed in accordance with each user instruction, and then the output data in the input/output memory 7 is updated by the results of the processing. In addition, the input update operation which writes the input data from input/output device 2 in the predetermined area of input/output memory 7 is in synchronization with the execution of user program, and the output update operation which transfers the output data of the predetermined area of the input/output memory 7 to the input/output device 2 are performed, thereby creating a sequential state assigned by the user program for the relation between the input data to be given to the input/output device 2 and the output data to be taken out from the input/output device 2. The input/output data transmission method embodying the present invention performs the input/output data transmission between the controller main unit 1 and input/output device 2 in order to perform said input update operation and output update operation.

As terminals for data transmission, the controller main unit 1 has serial data input/output terminal SDT and clock signal output terminal CKT. A signal applied to the serial data input/output terminal SDT is given through a receiver 9 to an input port P1. Signal from an output port P2 is applied through a driver 10 to the serial data input/output terminal SDT. This driver 10 is inhibited by a signal from the output port P3. A clock signal sent out from the output port P4 is delivered through the driver 11 to the clock signal output terminal CKT.

The input/output device 2 has the terminals for data transmission such as a left serial data input/output terminal SDL, a right serial data input/output terminal SDR, a clock input terminal CKL and a clock signal output terminal CKR. With three input/output devices 2, the right serial data input/output terminal SDR of each device is connected to the left serial data input/output terminal SDL of the next device with a serial data conductor 12, the clock signal output terminal CKR of a device is connected to the clock signal input terminal CKL of the next device with a clock signal conductor 13, and thus three devices are connected in series with these transmission conductors 12 and 13. Also, the left serial data input/output terminal SDL of the input/output device 2 at the left end is connected to the serial data input/output terminal SDT of the controller main unit 1 with the serial data conductor 12, and the clock signal input terminal CKL of the device is connected to the clock signal output terminal CKT of the controller main unit 1 with the clock signal conductor 13. That is, the controller main unit 1 is connected in series to three input/output devices with the serial data conductor 12 and clock signal conductor 13. And the right serial data input/output terminal SDR and clock signal output terminal CKR of the input/output device 2 at the right end remain open. Also, another input/output device 2 may be additionally connected in series to the opened right serial data input/output terminal SDR and clock signal output terminal CKR.

Figure 2:
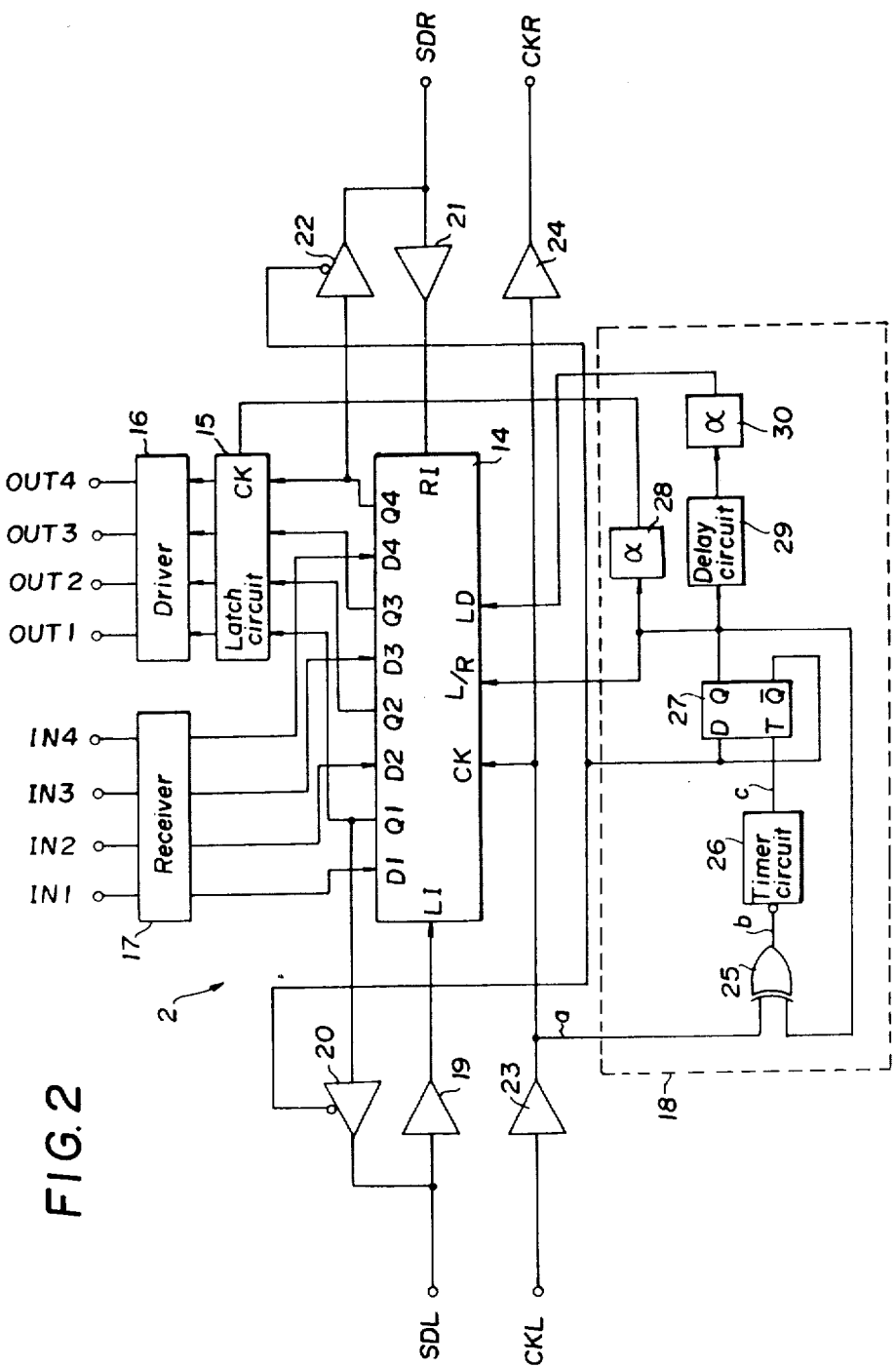
FIG. 2 is a block diagram showing the actual configuration of an input/output device.

FIG. 2 shows a detailed circuit diagram of an input/output device 2. As shown in this figure, this input/output device 2 has a bidirectional shift register 14 connected to the controller main unit 1 with the serial data conductor 12 and clock signal conductor 13, a latch circuit 15 connected to the parallel output ends Q1 to Q4 of the shift register 14, a driver 16 which sends out in parallel the output of the latch circuit 15 in the form of the external output signals OUT1 to OUT4, a receiver 17 which receives in parallel the external input signals IN1 to IN 4 and applies them to the parallel input ends D1 to D4 of said shift register 14, and a control circuit 18 which detects that the clock signal of the clock signal conductor 13 stops and that the level of the signal conductor 13 is fixed for a predetermined time, and which produces the latch signal of said latch circuit 15 and the parallel data read signal LD and shift direction control signal L/R of said shift register 14. Also, the signal applied to the left serial data input/output terminal SDL is entered through the driver 19 in the left signal data input end L1 of the shift register 14. Also, the right serial output signal Q1 of the shift register 14 is sent out through a driver 20 with gates to the left serial data input/output terminal SDL. In the same manner, the signal applied to the right serial data input/output terminal SDR is entered through the receiver 21 to the right serial data input end RI of the shift register 14. The right serial output signal Q4 of the shift register 14 is sent out through the driver 22 with gates to the right serial data input/output terminal SDR. The signal applied to the clock signal input terminal CKL is received through the receiver 23, entered in the shift clock signal terminal CK of the shift register 14 and also in the control circuit 18, and is sent out through the driver 24 to the clock signal terminal CKR.

When the clock signal sent out from the controller main unit 1 to the clock signal conductor 13 has a period of T0, the control circuit 18 will detect that said clock signal is stopped and that the signal level of the signal conductor 13 is fixed to H level or L level and continued for a certain duration T1 which is sufficiently larger than said clock period T0. This detection is performed by an EOR circuit 25, a timer circuit 26 and a flip-flop 27. The flip-flop 27 is initially reset at the time of turning-on of the power. The output $\bar{Q}$ of the flip-flop 27 and the output signal a (signal of clock conductor 13) of the receiver 23 are entered in EOR circuit 25, its output signal b is entered in the timer circuit 26, and the flip-flop 27 is inversion-controlled by the output signal c from the timer circuit 26.

When the input signal b of the timer circuit 26 has L level continuously for said duration T1, the output signal c is sent out, thereby inverting the flip-flop 27. Therefore, when the flip-flop 27 is set and $Q=H$ occurs, the timer circuit 26 detects that the signal a of the clock signal conductor 13 has obtained H level which remains for a duration of T1 or more and that the level of signal a of the clock signal conductor 13 is maintained above L level for a duration of T1 or more after the flip-flop 27 was reset and $Q=L$ occurred.

The Q output of the flip-flop 27 becomes the shift direction control signal L/R of the shift register 14. And the shift register 14 has the right shift mode when $Q=L$ and the left shift mode when $Q=H$. The $\bar{Q}$ output of the flip-flop 27 becomes the inhibiting signal of the serial data drivers 20 and 22 so as to inhibit the drivers 20 and 22 during the left shift mode of the shift register 14 with which $\bar{Q}=L$.

Also, a rise of $\bar{Q}$ output in the flip-flop 27 to H level is detected by a differential circuit 28 for detecting the rise, and the output pulse of the differential circuit 28 is applied as the latch signal CK of said latch circuit 15. The Q output of flip-flop 27 is slightly delayed in the delay circuit 29, the delayed output is entered in the differntial circuit 30 for detecting the rise, and the output pulse from the differential circuit 30 is applied as the parallel data read signal LD of said shift register 14.

As a result of the connection in series of three input/output devices 2 with the configuration as stated above, the bidirectional register of $4 \times 3 = 12$ bits is formed as a whole, and the left serial data input/output terminal SDL and clock signal input terminal CKL at the left end of the register are connected to the controller main unit 1.

Now, the operation of the transmission of the input/output data at the side of the controller main unit 1 will be described below. The controller main unit 1 sends out a predetermined number of clock signals through the driver 11 from the port P4 of the input/output port 8 to said clock signal conductor 13 in order to shift the shift register 14 to the right, sends out sequentially the output data in series through the driver 10 from the port P2 to said serial data conductor 12 in synchronization with the shifting and sets these output data in said shift register 14, said output data set in said shift register 14 is latched in said latch circuit 15 by fixing the level of said clock signal conductor for a predetermined duration of T1, the input data from said receiver 17 is read in said shift register 14, the shift direction control signal L/R of said shift register 14 is inverted, a predetermined number of clock signals are sent out to the clock signal conductor 13 in order to shift the shift register 14 to the left, and the input data set in the shift register 14 is sequentially taken through the serial data conductor 12 and receiver 9 from the port P1 of the input/output port 8 to the controller main unit 1. This operation is all performed by CPUs by executing the input/output data transmission routine stored in the system program memory 4.

Figure 3:
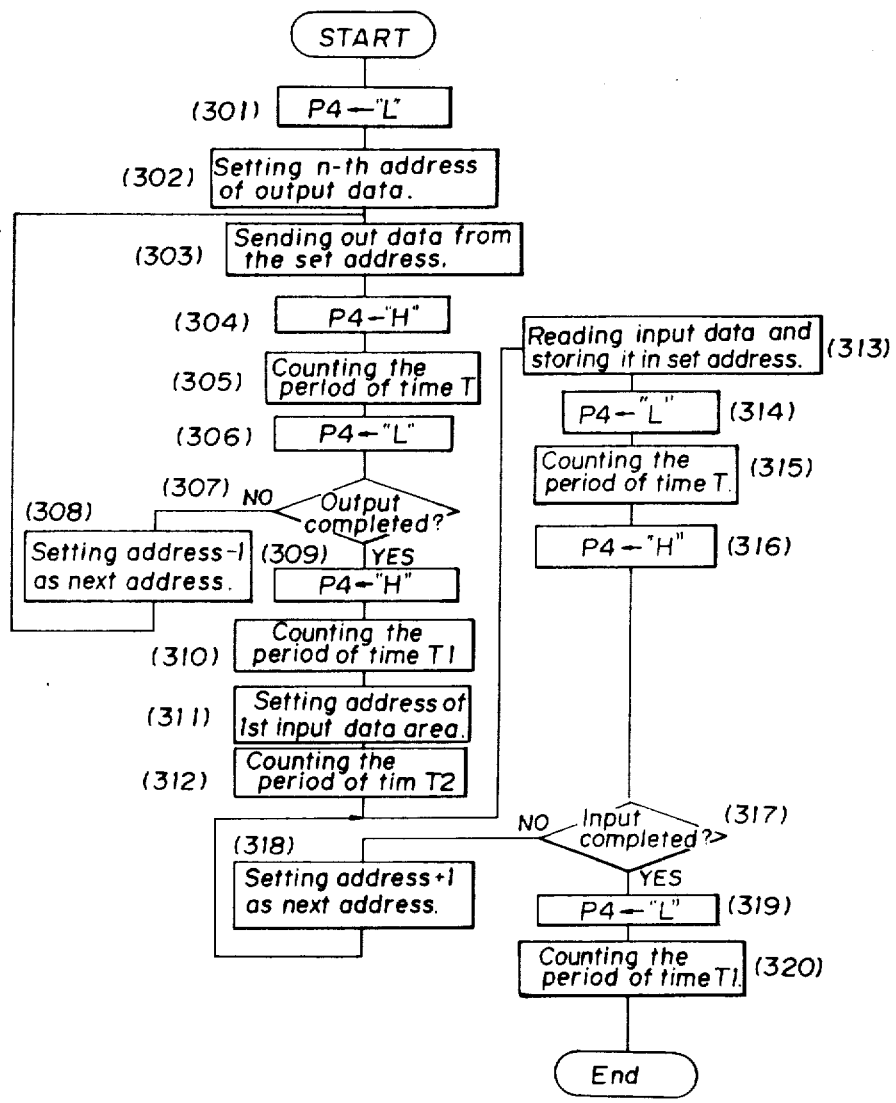
FIG. 3 is a flowchart showing the outline of an input/output data transmission routine to be executed at the main unit side of the controller.

FIG. 3 is a flowchart showing the outline of the input/output data transmission routine. Now, the data transmission operation will be described in detail hereinafter in conformity with this flowchart. In the first step 301, the level of the output port P4 is set to L level. In the next step 302, the address of the last data OUT 12 is set. In the next step 303, the output data OUT 12 of the set address is sent out from the output port P2. At this time, the driver 10 is of course operated by the signal from the output port P3.

In the next step 304, the signal of the output port P4 is set to H level. In the next step 305, the counting is performed for a duration of T which is slightly shorter than the period T0 of the clock signal. In the step 306 after an elapse of duration T, the signal of the output port P4 is set to L level. In the next step 307, it is checked whether the transmission up to the output data OUT1 is completed or not. If the transmission has not been completed, then the operation advances to the step 308, the address of the output data is deducted by 1, and the address of the output data OUT11 is set. Then, the operation returns to the step 303.

By repeating the above steps 303 to 304, to 305, to 306, to 307 and to 308 for the output data OUT12 to OUT1, each output data is sent out from the controller main unit 1 in synchronization with the clock signal.

Upon completion of the output data transmission operation, the operation advances from step 307 to step 309, and the signal of the output port P4 is set to H level. In the next step 310, time T1 required for operating said control circuit 18 is counted. Then, the signal level of the clock signal conductor 13 is fixed to H level for more than a duration of T1, the control circuit 18 operates, the output data set in the shift register 14 is latched in the latch circuit 15 and sent out through the driver 16, the input data from the receiver 17 is read in the shift register 14, and then the shift direction of the shift register 14 is inverted.

At the side of controller main unit 1, the address of the first input data IN1 is set in the next step 311. In the next step 312, the operation waits for a delay time of T2 of said delay circuit 29. Also, the driver 10 is inhibited by the signal from the output port P3. In the next step 313, input data applied to the input port P1 is read and stored in the address set. In the next step 314, the signal of the output port P4 is set to L level. In step 315, said duration T is counted. In step 316, the signal of the output port P4 is set to H level. In step 317, it is checked whether the data intake up to the input data IN12 has been completed or not. If it is not completed, the operation advances to the step 318, the address of the input data is stepped forward, and then the address of the second input signal IN2 is set. Then, the operation returns to the step 313.

By repeating the steps 313, to 314, to 315, to 316, to 317, and to 318 for the input data IN1 to IN12, the input signals set in the shift register 14 are sequentially taken in the input port P1 and sequentially written in the predetermined area of the input/output memory 7. Upon completion of the input data intake operation, the operation advances from the step 317 to step 319, thereby setting the signal of the output port P4 to L level. In the step 320, the duration T1 required for operating the control circuit 18 is counted. Then, the control circuit 18 is reset to the initial state. The above operation is performed in parallel to the execution of the user program.

As described above in detail, according to the input/output data transmission method of the programmable controller of the present invention, the bidirectional signal transmission including the intake of input data and sending-out of output data can be performed only by connecting the controller main unit to the input/output devices with two systems including the serial data conductor and clock signal conductor, thereby greatly simplifying the wiring of the transmission lines at a lower cost. Also, the input/output device requires no circuit for judging addresses nor control circuit for handling troublesome transmission control procedure, and only a very simple control circuit consisting of timer circuits and flip-flops is needed for detecting that the clock signal has stopped and the clock signal level has been fixed for more than a predetermined duration. Therefore, the configuration of the transmission control portion of the input/output device can be greatly simplified and produced at low cost. Also, if an expansion of the input/output device becomes necessary, then the additional input/output devices can be added only by connecting them in series. And the input/output data can be properly transmitted only be letting the controller main unit recognize the number of the input/output devices connected, so that the flexibility in increasing or decreasing the system can be greatly improved.

Figure 4:
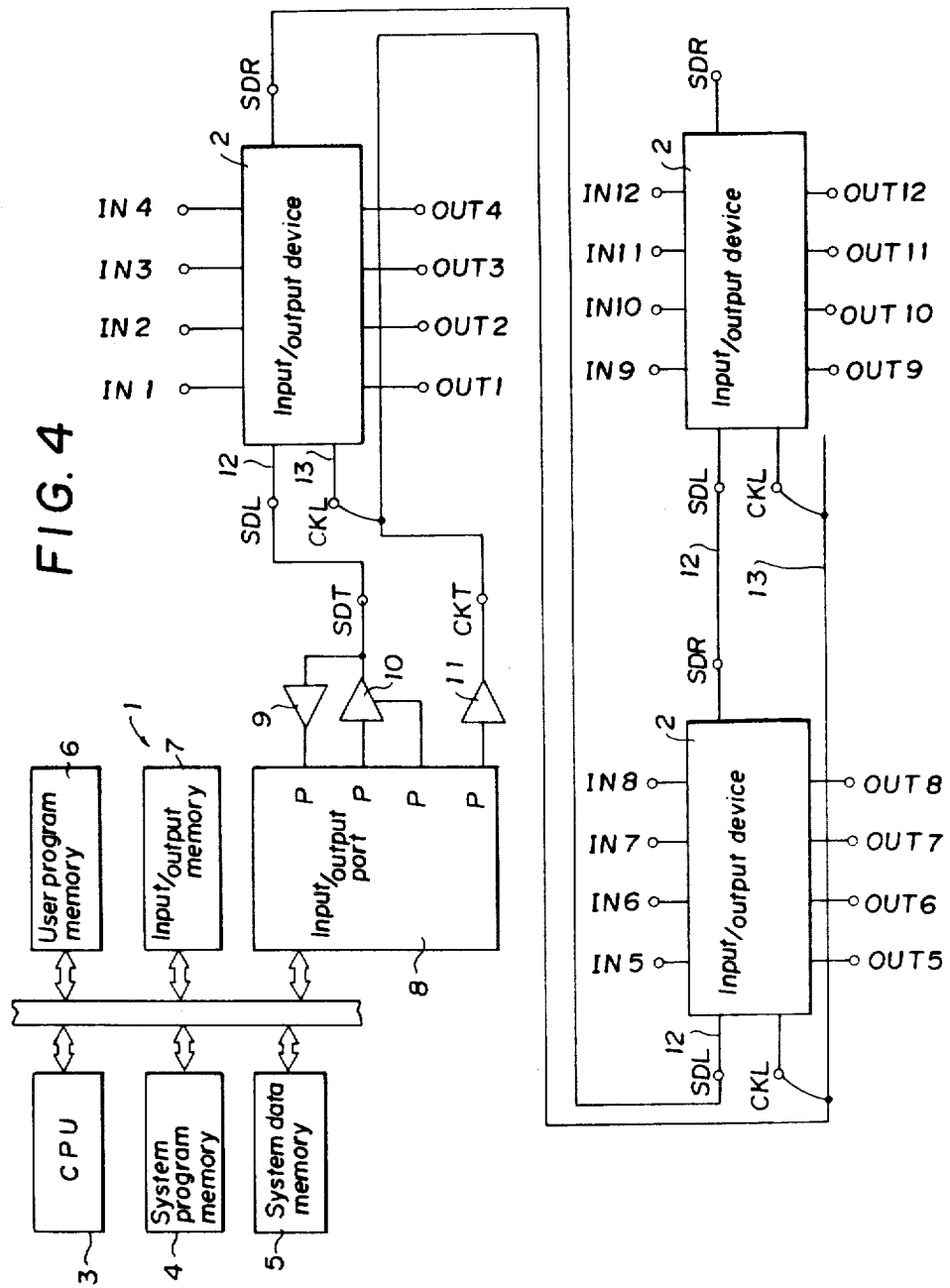
FIG. 4 is a block diagram showing the schematic configuration of a programmable controller system of the second embodiment of the present invention.

FIG. 4 is a block diagram showing the schematic configuration of the whole of the programmable controller of the second embodiment of the present invention. Differently from the first embodiment described before, the second embodiment shown in FIG. 4 has three input/output devices which are connected in parallel to the controller main unit 1 with clock signal conductor 13. Thus, the same codes used for the first embodiment of FIG. 1 will be used also for the second embodiment and its description will be omitted.

Figure 5:
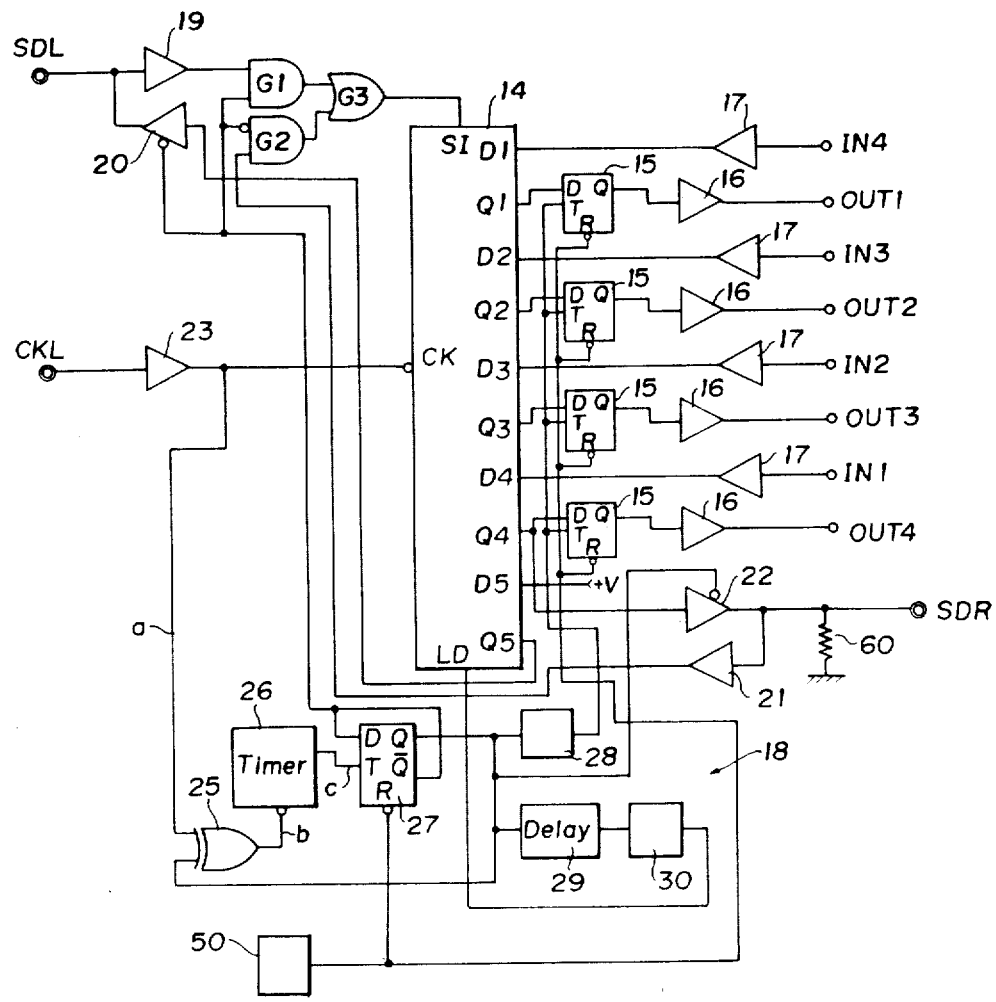
FIG. 5 is a block diagram showing the actual configuration of an input/output device.

FIG. 5 shows a circuit diagram of an input/output device in detail. As shown there, this input/output device has a 5-bit one-directional shift register 14, a latch circuit 15 connected to the parallel output ends Q1 to Q4 for 1 to 4 bits of the shift register 14, a driver 16 for sending out in parallel the output of the latch circuit 15 in the form of the external output signals OUT1 to OUT4, a receiver 17 for receiving in parallel the external input signals IN4 to IN1 and applying them to the parallel input ends D1 to D4 for 1 to 4 bits of said shift register 14, a circuit for applying a signal always in H level to the input end D5 of the 5th bit of said shift register, a receiver 19 for receiving a signal applied to the left serial data input/output terminal SDL, a driver 20 with gates for sending out a signal to the left serial data input/output terminal SDL, a receiver 21 for receiving a signal applied to the right serial data input /output terminal SDR, a driver 22 with gates for sending out a signal to the right serial data input/output terminal SDR, a receiver 23 for receiving a signal applied to the clock signal input terminal CKL, a change-over circuit (consisting of drivers 20 and 22 with gates and logical gates G1, G2 and G3) for switching to the state in which a signal applied to said left serial data input/output terminal SDL is turned into the serial input SI of said shift register 14 and the serial output obtained from the output end Q4 at the 4th bit of said shift register 14 is guided to said right serial data input/output terminal SDR, or switching to the state in which a signal applied to the right serial data input/output terminal SDR is turned into the serial input SI of said shift register 14 and the serial output obtained from the output end Q5 at the 5th bit of said shift register 14 is guided to said left serial data input/output terminal SDL, and a control circuit 18 for detecting the fixing for more than a predetermined duration of the level of a signal applied to the clock signal input terminal CKL and for producing the latch signal of said latch circuit 15, the parallel input read signal of said shift register 14 and the inverted signal of said change-over circuit.

The signal applied to the clock signal input terminal CKL is received through the receiver 23, entered in the shift register 14 as the shift clock signal CK, and then entered in the control circuit 18.

If the period of the clock signal is T0 which is sent from the controller main unit 1 to the clock signal conductor 13, then the control circuit 18 will detect that the clock has stopped and the signal level of the signal conductor 13 is fixed to H level or L level continuously for more than a predetermined duration of T1 which is sufficiently larger than said clock period T0. This detection is performed by the EOR circuit 25, timer circuit 26 and flip-flop 27. The flip-flop 27 is initially reset by the power-on reset circuit 50 at the time of turning-on of the power. The output Q of the flip-flop 27 and the output signal a of receiver 23 (signal of clock conductor 13) are entered in EOR circuit 25, its output signal b is entered in the timer circuit 26 and, by its output signal c, the flip-flop 27 is inverted and controlled.

The timer circuit 26, when its input signal b has L level continuously for a predetermined duration of T1, sends out the output signal c, thereby inverting the flip-flop 27. Thus, the timer circuit 26, after the flip-flop 27 has been set and Q=H has occurred, detects the level of signal a of the clock signal conductor 13 which became H level for more than duration T1. Also, if the flip-flop 27 is reset and Q=L occurs, the timer circuit 26 detects the fixing of the signal a of the clock signal conductor 13 L level for more than a duration of T1.

The output of the flip-flop 27 becomes the control signal of said change-over circuit. That is, when the flip-flop 27 is reset and Q=L and $\overline{Q}$=H occur, the driver 20 and logic gate G2 are inhibited, driver 22 and logic gate G1 become active and, under such state, the signal applied to the left serial data input/output terminal SDL is entered in the serial input end SI of the shift register 14, and the signal from the serial output end Q4 of the shift register 14 is guided to the right serial data input/output terminal SDR. On the contrary, when the flip-flop 27 is set and Q=H and $\overline{Q}$=L occur, the signal applied to the right serial data input/output terminal SDR is entered in the serial input end SI of the shift register 14, and the signal from the serial output end Q4 of the shift register 14 is guided to the left serial data input/output terminal SDL.

Also, a rise of the Q output of the flip-flop 27 to H level is detected by the differential circuit 28 for detecting the rise, and the output pulse from the differential circuit 28 is applied as latch signal T of said latch circuit 15. The Q output of the flip-flop 27 is slightly delayed in the delay circuit 29, the delayed output is entered in the differential circuit 30 for detecting the rise, and the output pulse from this differential circuit 30 is applied as the parallel input read signal LD of said shift register 14.

Now, the transmission operation of the input/output data at the side of the controller main unit 1 will be described below. The controller main unit 1 sends out the clock signals of the predetermined number through the driver 11 from the port P4 of the input/output port 8 to the clock signal conductor 13 in order to shift said shift register 14, sequentially sends out the output data serially through the driver 10 from the port P2 to the serial data conductor 12 in synchronization with said shifting in order to set the output data in said shift register 14, then latches said output data set in said shift register 14 within said latch circuit 15 by fixing the level of clock signal conductor 13 for predetermined duration of T1, reads the input data from said receiver 17 in said shift register 14, inverts said change-over circuit, shifts again the shift register 14 by sending out the clock signals of a predetermined number to the clock signal conductor 13, and takes the input data set in the shift register 14 through the serial data conductor 12 and receiver 9 sequentially from the port P1 of the input/output port 8 in the controller main unit 1. This operation is performed by executing the input/output data transfer routine stored in the system program memory 4 by CPU 3.

Also, the controller main unit 1 is able to know the number of the input/output devices 2 actually connected by the procedure described below. That is, according to the programmable controller system of the present invention, it is not required to always connect the allowable maximum number N of the input/output devices 2 to the controller main unit 1 and, instead, any number lower than N of the input/output devices 2 may be connected as required by an user. And, if only number M (smaller than N) of input/output devices are connected, the number of input/output devices 2 connected will be known in order to perform the transmission control only for the number of input/output devices actually connected so as to reduce the time to be taken for the input/output data transmission.

As made clear from the description made previously, when sending the output data from the controller main unit 1 to input/output device 2, the left serial data input/output terminal SDL of the input/output device 2 is connected to the serial input terminal SI of the shift register 14, and the serial output end Q4 of the shift register 14 is connected to the right serial data input/output terminal SDR, so that the shift register 14 operates as a 4-bit shift register when it is seen from the input/output terminals SDL and SDR. Also, when sending the input data from the input/output device 2 to the controller main unit 1, the right serial data input/output terminal SDR is connected to the serial input terminal SI of the shift register 14, the serial output end Q5 of the shift register 14 is connected to the left serial data input/output terminal SDL and, at this time, the shift register 14 between both the input/output terminals SDR and SDL operates as a 5-bit shift register.

At the time of input data transmission when the shift register 14 operates as a 5-bit shift register, the parallel input signals D1 to D5 read in the shift register 14 by the parallel input read signal LD are synchronized with the clock signal applied to the clock signal input terminal CKL and sent out from the serial data input/output terminal SDL in the order of D5 to D4 to D3 to D2 to D1. As shown in FIG. 2 IN4 is entered in D1, IN3 in D2, IN3 in D3 and IN1 in D4 respectively, and the signal always in H level is entered in D5 as stated previously. Thus, among the 5-bit serial data sent from the serial output end Q5 of the shift register 14 to the left serial data input/output terminal SDL, the first bit must be always a signal of H level, and then the 4-bit external input signals of IN1 to IN2 to IN3 to IN4 are sequentially sent out.

On the other hand, as shown in FIG. 2, the input side of the receiver 21 which receives the signal applied to the right serial data input/output terminal SDR is pulled down to ground potential with a register 60 and no subsequent input/output devices 2 are connected to the right serial data input/output terminal SDR so that, if this terminal SDR is opened, a L-level signal will be entered in the receiver 21. Thus, if another device 2 is not connected to the next stage of the input/output device 2 shown in FIG. 2, and if five clock signals are given to the terminal CKL after the parallel input read signal LD has been given to the shift register 14, then 5-bit serial data is sent out to the left serial data input/output terminal SDL in the order of H level signal to IN1 to IN2 to IN3 to IN4. Subsequently, when five clock signals are given to the terminal CKL, L level signals from the opened right serial data input/output terminal SDR are sent to the left serial data input/output terminal SDL.

Therefore, the controller main unit 1 is able to recognize whether the input/output device 2 is connected or not depending upon the H level or L level of the input data entered in synchronization with the first pulse every time when five clock pulses have been sent out.

Figure 6:
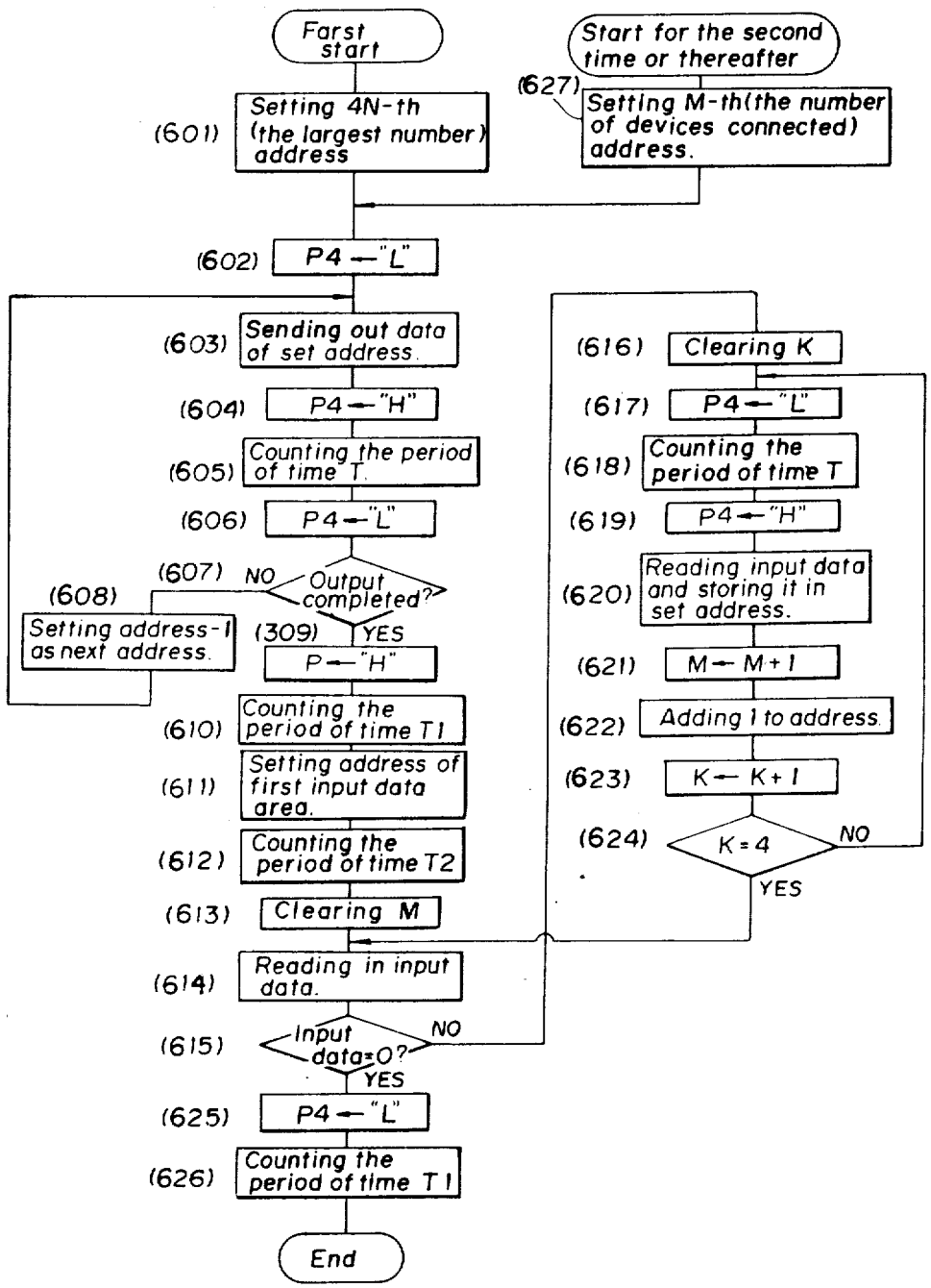
FIG. 6 is a flowchart showing the outline of the input/output data transmission routine to be executed at the main unit side of the controller in the input/output device shown in FIG. 5.

FIG. 6 is a flowchart showing the outline of the input/output data transmission routine stated above which is to be executed by the controller main unit 1. Now, the data transmission operation will be described below in accordance with this flowchart. At the time of first data transmission, the operation will begin from the step 601. In step 601, the address 4N of the last output data when the maximum allowable number of input/output devices 2 have been connected to the controller main unit 1 will be set. In the next step 602, the output port P4 is set to the L level. In step 603, the output data of the set address is sent out from the output port P2. At this time, the driver 10 is of course operated by the signal from the output port P3.

In step 604, the signal from the output port P4 is set to H level. In step 605, the counting is performed for a duration of T which is slightly shorter than the period T0 of the clock signal. In step 606 after an elapse of time T, the signal of the output port P4 is set to L level. In the step 607, it is checked whether the transmission up to the output data OUT1 is completed or not. If the transmission has not been completed, the operation advances to the step 608, the address of the output data is deducted by 1, and the address of the output data OUT (4N-1) is set. Then, the operation returns to the previous step 603.

When the above steps 603 to 604 to 605 to 606 to 607 to 608 are repeated for the output data OUT (4N) to OUT 1, each output data is sent from the controller main unit 1 in synchronization with the clock signal.

Upon completion of the output data transmission operation stated above, the operation then advances from step 607 to step 609, and the signal of the output port P4 is set to H level. In the next step 610, the time T1 required for operating said control circuit 18 is counted. Then, the signal level of the clock conductor 13 is fixed to H level for more than the duration T1, the control circuit 18 operates, the output data set in the shift register 14 is latched in the latch circuit 15 and sent out through the driver 16, the input data from the receiver 17 is read in the shift register 14, and also the connecting relation of the change-over circuit described above is inverted.

At the side of the controller main unit 1, the address of the first input data IN1 is set in the step 611. In the next step 612, the operation is waited for the delay time T2 of said delay circuit 29. Also, the driver 10 is inhibited by the signal from the output port P3. In the next step 613, the counter m for counting the number of the input/output devices 2 is cleared. In the next step 614, the input data to be applied to the input port P1 is read. In the step 615, it is checked whether the input data is in H level or L level. As explained previously, if this first input data is in H level, this means that the first input/output device 2 is connected. In this case, the operation advances to the step 616, and base-4 counter K is cleared. In the next step 617, the signal of the output port P4 is set to L level. In step 618, said duration T is counted. In the next step 619, the signal of the output port P4 is set to H level. In the next step 620, the input data to be applied to the input port P1 is read and stored in the set address. In the next step 621, +1 is added to the counter m for counting the number of the devices connected. In the step 622, +1 is added to the set address. In the next step 623, +1 is added to the base-4 counter K. In the next step 624, it is checked whether the base-4 counter K is counted up or not. If no counting-up has been made, the operation returns to the previous step 627.

By repeating the steps 617 to 627 stated above four times, the 4-bit input data IN1 to IN4 of the first input/output device 2 are taken in the controller main unit 1 and stored in a predetermined address.

When said base-4 counter K is counted up, the operation returns to the previous step 614, and the input data applied to the input port P1 is read. Then, in the same manner as described above, it is checked whether the input data is in H level or L level. If the input data is in the H level, this means that the second input/output device 2 is connected. In this case, the operation advances to the step 616 and, as same as the case of the first input/output device, the input data IN5 to IN8 are read and stored in the predetermined address and +1 is added to the counter m for counting number of device every time when the input data is read.

When 3 input/output devices 2 are connected as shown in FIG. 1 and the operation returns from step 624 to step 614 after the counter m becomes "12", L level of the input data read in the step 614 is detected in the step 615. That is, the fourth input/output device not being connected wil be detected. In this case, the operation advances from the step 615 to step 625, and the signal of the output port P4 is set to the L level. In the next step 626, time T1 required for operating the control circuit 18 is counted. Then, the control circuit 18 and the change-over circuit is reset to the initial state. If the number of the input/output devices 2 connected is M, then m=4×M will be counted by the counter m. For the second and subsequent transmission of the input/output data, the operation starts from the step 627 not from the step 601. That is, at the time of sending the output data from the controller main unit 1, the address of the last output signal of the input/output device 2 actually connected is set and then the output data will be sent out from there while decrementing the address. Therefore, the sending time for the output data for the meaningless unconnected input/output device 2 can be fully eliminated.

As described above, the input/output device of this embodiment can be formed with the one-directional register less expensive than the bidirectional register in addition to the effects of said first embodiment of the present invention, so that this kind of input/output device can be produced at a lower cost and its input/output data transmission time can be reduced to a minimum because the number of the input/output devices connected can be known at the side of controller main unit.

Figure 7:
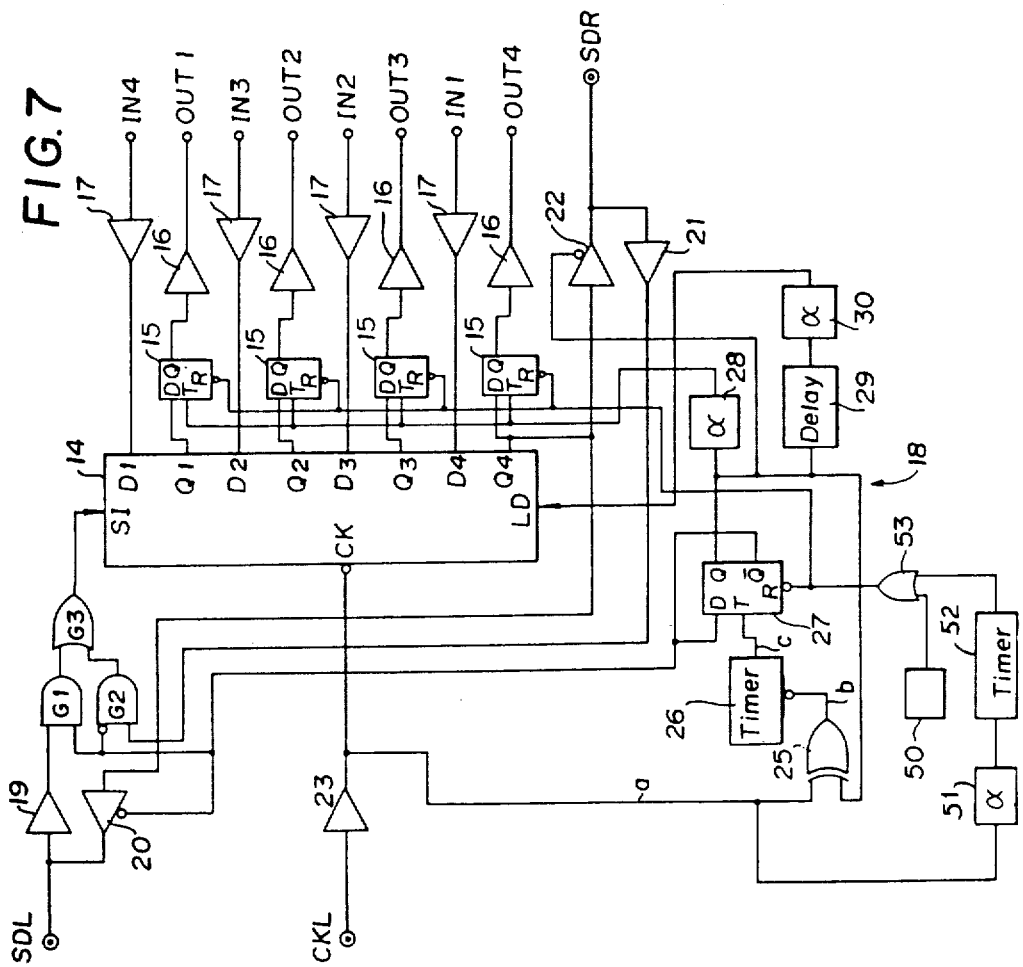
FIG. 7 through FIG. 10 are the block diagrams showing other embodiments of the present invention.

Also, in another embodiment of the present invention, an input/output device as shown in FIG. 7 may be considered. The same codes and symbols as those of FIG. 5 are used but the description for them will be omitted.

That is, the timer circuit 52 and differential circuit 51 are connected through an OR-gate 53 to a flip-flop.

By providing the configuration as described above, the output signal a of a receiver 23 can be given to a differential circuit 51 for detecting the rise and fall, and small pulses are produced at the changing point of signal a. The pulses sent out from this differential circuit 51 become the trigger signal of the timer circuit 52. This timer circuit 52 is used for detecting the fixing of a signal of the clock signal conductor 13 to a certain level for a long time due to trouble in the controller main unit 1. If the signal a is fixed for a certain duration T3 which is sufficiently longer than the setting time T1 of said timer circuit 26, an output signal is sent out from this timer circuit 52. The output signal of this timer circuit 52 is entered in the OR-gate 53 together with the output signal of said power-on reset circuit 50, and the output from the OR-gate 53 becomes the reset signal of the flip-flop 27 and also becomes the reset signal of the latch signal of the latch circuit 15. Thus, a reset circuit is formed, which is able to detect any abnormal state in the controller main unit 1 by means of the differential circuit 51 and timer circuit 52 and then returns the control circuit 18 and latch circuit 15 to the initial state. By means of this configuration, if the clock signal conductor 13 is broken or the signal applied to the clock signal input terminal CKL of the input/output device remains fixed to a certain level for a long time (longer than said duration T3) as a result of trouble in the clock signal send-out system of the controller main unit 1, then the abnormal state can be detected by the reset circuit consisting of the differential circuit 51 and timer circuit 52 explained before, the latch circuit 15 can be reset by the detection signal, the output signals OUT1 to OUT4 can be all set to L level, and the flip-flop of the control circuit 18 can be reset to the initial state.

That is, if trouble occurs in the clock signal send-out system of the controller main unit or the clock signal conductor is broken, then the latch circuit which gives the external output signal and also the control circuit are reset to the initial state respectively and, thus, safety can be maintained and the recovery can be made easily without disturbing the controlled equipment.

Figure 8:
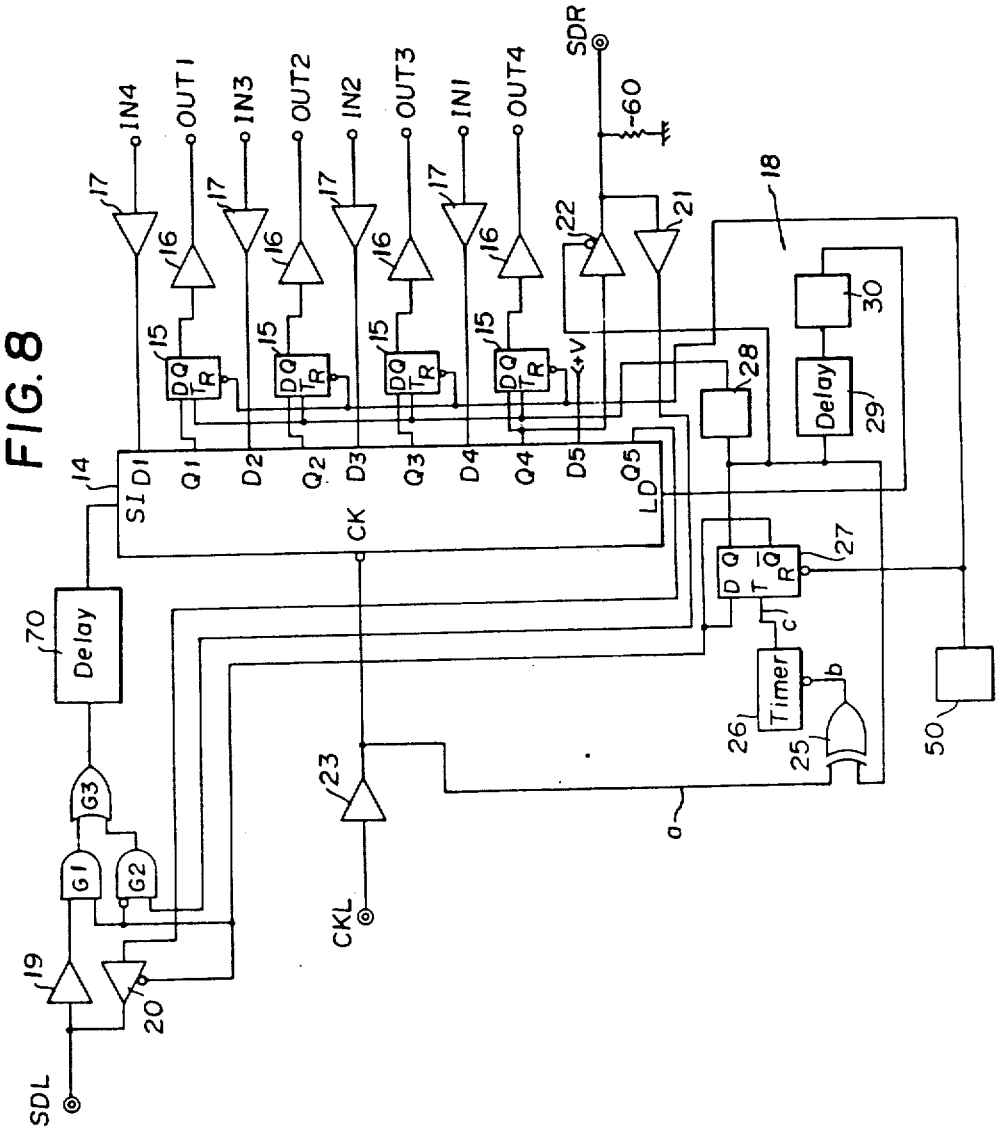

FIG. 8 shows another embodiment of the present invention. The same codes and symbols as those of FIG. 5 are used for the same portions and no description will be made for them.

According to this embodiment shown in FIG. 8, a delay circuit 70 is provided at the side of a serial input end SI of the shift register 14.

However, when the delay circuit 70 is provided as described above, the clock signal CK applied to the shift register 14 will be slightly delayed with respect to the original clock signal sent out from the controller main unit 1 because of a transmission delay due to a delay in the input/output response by the receiver 23 or stray capacity of the clock signal conductor 13. Also, by the same causes, the data signal transmitted through the serial data conductor 12 is delayed. And the delay of the signal will vary in every input/output device. If the change timing of the clock signal CK applied to the shift register 14 in each input/output device 2 is not the same, then the timing for sending out the data signal from the first stage input/output device 2 may be deviated from the timing for the data reading at the second stage input/output device 2. And if the shift timing for the first stage becomes faster than the shift timing for the second stage, then correct data cannot be transmitted from the first stage to the second stage. Said delay circuit 70 is provided in order to prevent this kind of error transmission of the data signal. That is, even though the shift timing for the first stage becomes faster than the shift timing for the second stage, the signal on the serial data conductor 12 is delayed by the delay circuit 70 and becomes the serial input SI of the shift register. Since the delay time of the delay circuit 70 is set to a time which will be able to absorb the dispersion in delay time of said clock signals, no transmission error will be created even if a deviation in timing occurs as stated above.

Said delay circuit may be also placed at the serial output side of the register, that is, in front of the driver with gates.

By providing the delay circuit 70 stated above, the correct data transmission can be always performed and the reliability of the data transmission can be further improved without being affected by a deviation in shift timing due to dispersion of the clock signals at many input/output devices.

Figure 9:
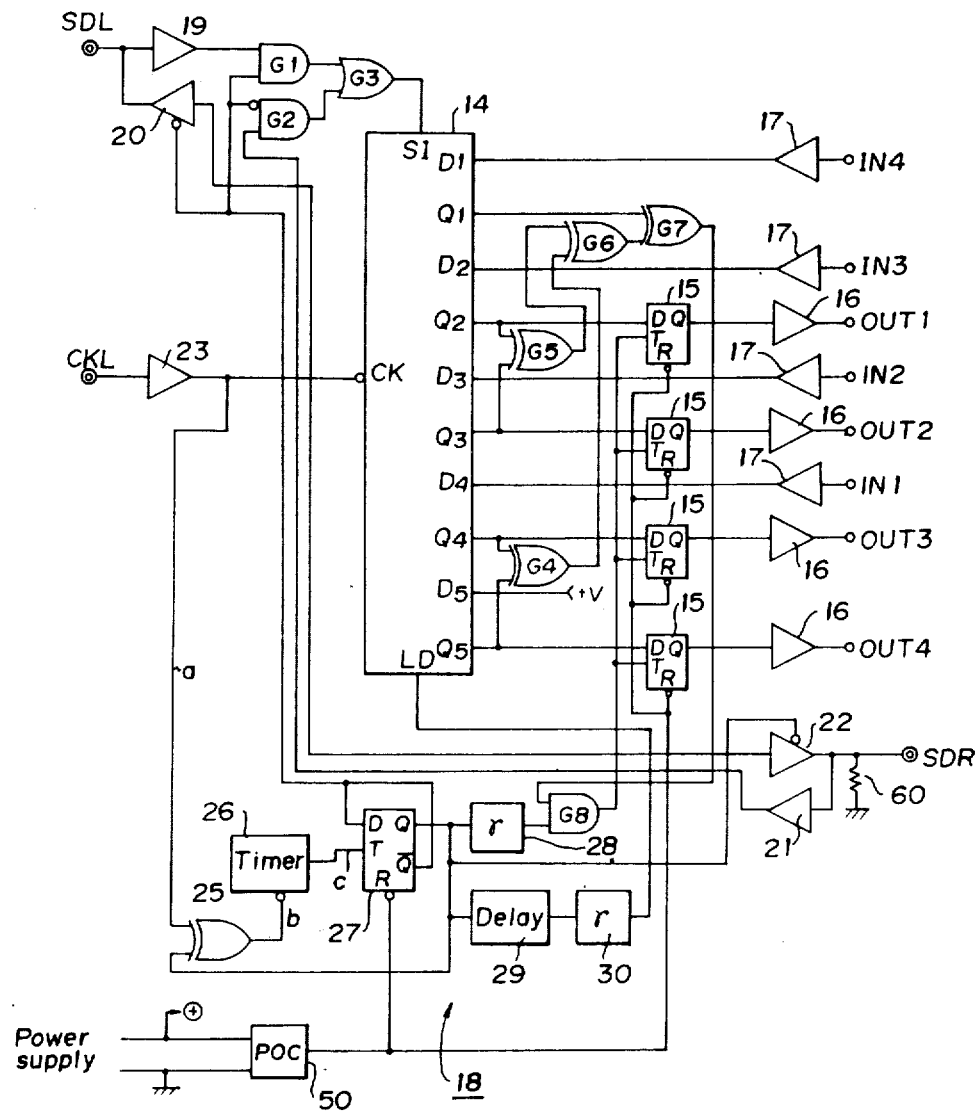

FIG. 9 shows another embodiment of the present invention. The same codes and symbols as those of FIG. 5 are used for the same portions and no special description will be made here for them.

According to the embodiment shown in FIG. 9, a parity check circuit (consisting of four EOR circuits G4, G5, G6 and G7) is connected to the parallel output ends Q1 to Q5 of the shift register 14.

By providing the parity check circuit as described above, the parity check of the output data sent from the side of the controller main unit can be performed so as to prevent the output data, for which a parity error is detected, from being sent out and thus any error control operation based on the error output data can be prevented.

Figure 10:
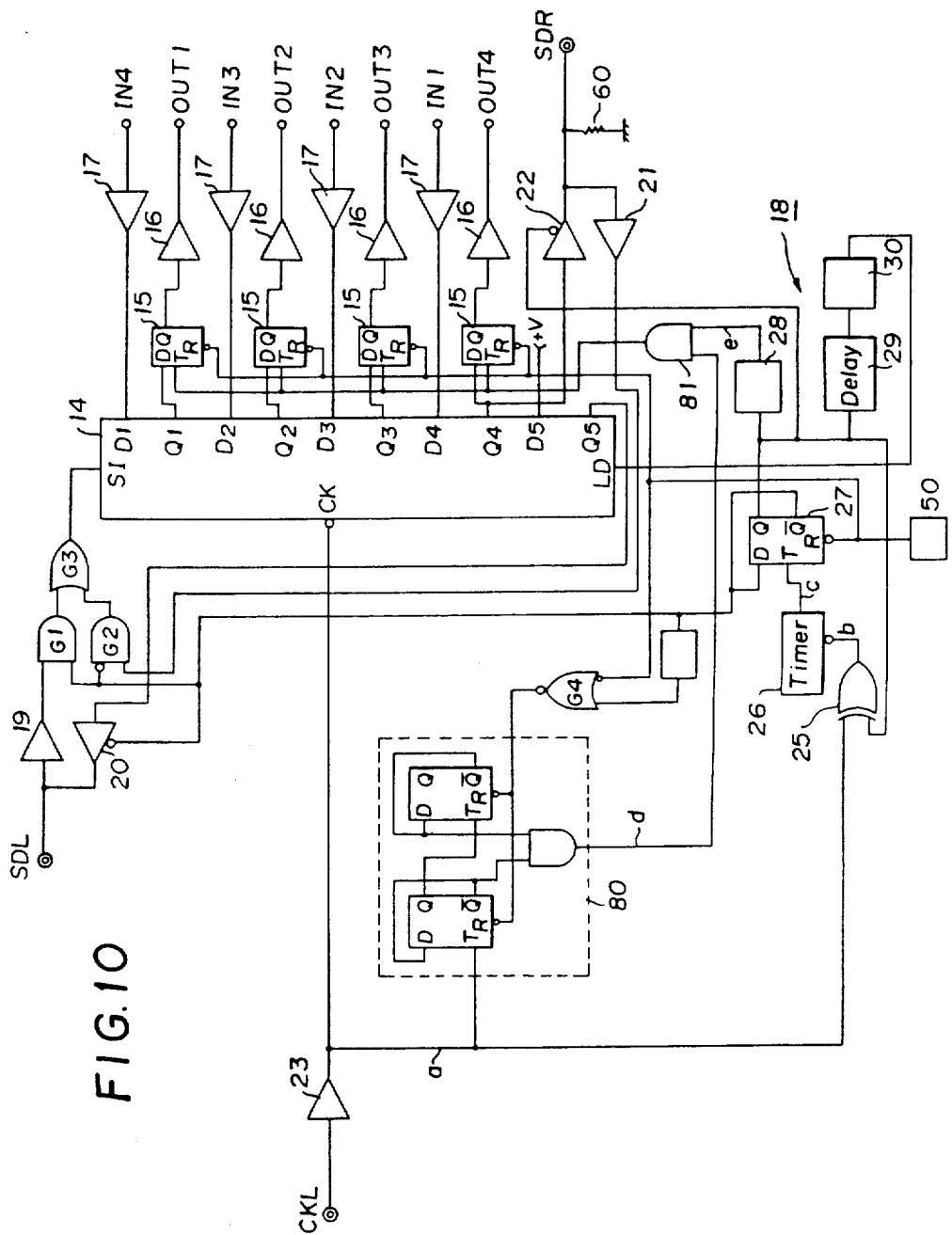

FIG. 10 shows another embodiment of the present invention. The same codes and symbols as those of FIG. 5 are used for the same portions and no special description will be made here for them.

The embodiment of the present invention shown in FIG. 10 has a counter 80 which counts the clock signals applied to the clock signal input terminal CKL and generates an output signal d every time the counted value becomes equal to the number of shifts of the shift register 14 while the output data is being shifted from the left serial data input/output terminal SDL to the right serial data input/output terminal SDR, and also has a gate circuit 81 which allows the application of the latch signal e from the control circuit 18 to the latch circuit 15 only when the output signal d is being sent out from said counter 80.

By providing the configuration as descibed above, even if noise is mixed in the clock signal conductor or even if the clock signal is not properly transmitted to the input/output device by other causes, the embodiment of FIG. 10 of the present invention is able to prohibit the sending out of any output data as an external output signal resulted from such an error transmission, thereby further improving the reliability of the operation for the system.

As many apparently widely different embodiments of the present invention may be made without departing from the spirit and scope thereof, it is to be understood that the invention is not limited to the specific embodiments thereof except as defined in the appended claims.

What we claim is:

1. An input/output device for receiving external input signals and delivering external output signals for a programmable controller separately provided from said input/output device, comprising:

two serial data input/output terminals,
a clock signal input terminal,
a shift register shifted by a clock signal applied to said clock signal input terminal,
a clock circuit connected to a parallel output end of said shift register,
a driver for sending out in parallel an output as external output signals from a latch circuit,
a receiver for applying external input signals received, in parallel, to a parallel input end of said shift register,
change-over means for switching depending upon which input end or output end is to be selected out of said two serial data input/output terminals in relation with said shift register, and
a control circuit for stopping said clock signal in said clock signal conductor, for detecting the fixing of the signal level in said signal conductor for more than a predetermined period of time, and for producing a latch signal for said latch circuit, a parallel data read signal for said shift register and a control signal for said change-over means.

2. The input/output device for the programmable controller of claim 1, said shift register being a bidirectional register.

3. The input/output device for the programmable controller of claim 1, said shift register being a one-directional register.

4. An input/output device for a programmable controller, comprising;

two serial data input/output terminals A and B,
a clock signal input terminal,
a $(X+1)$-bit shift register shifted only in one direction by a clock signal applied to said clock signal input terminal,
a latch circuit connected to parallel output ends of 1 to X bits of said shift register,
a driver for sending out in parallel an output from said latch circuit as external output signals, a receiver for receiving in parallel input signals and applying said input signals to parallel input ends of 1 to X bits of said shift register, a circuit for always applying a high level (H) signal to an input end of (X+1)th bit of said shift register, a change-over circuit to be switched to any one of the states where a signal applied to said input/output terminal A is used as a serial input of said shift register and a serial output obtained from an output end of X-th bit of said shift register is sent to said input/output terminal B, and where a signal applied to said input/output terminal B is a serial input of said shift register and a serial output obtained from an output end of (X+1)th bit of said shift register is sent to said input/output terminal A, and a control circuit for detecting the fixing of the level of a signal applied to said clock signal input terminal for more than a predetermined period of time and for producing a latch signal for said latch circuit, a parallel input read signal for said shift register and an inverted signal for said change over circuit.

5. The input/output device for the programmable controller of claim 4, said change-over circuit being formed with a driver with gates and logic gates.

6. An input/output device for a programmable controller, comprising:

two serial data input terminals A and B, a shift register shifted by a clock signal applied to said clock signal input terminal, a latch circuit connected to a parallel output end of said shift register, a driver for sending out in parallel an output from said latch circuit as external output signals, a receiver for receiving in parallel external input signals and applying said external input signals to parallel input terminals of said shift register, a change-over circuit for switching to any one of the states where a signal applied to said input terminal A is a serial input of said shift register and a serial output of said shift register is sent to said input/output terminal B, and where a signal applied to said input/output terminal B is a serial input of said shift register and a serial output of said shift register is sent to said input/output terminal A, a control circuit for detecting the fixing of the level of a signal applied to said clock signal input terminal for more than a predetermined period of time T1 and for producing a latch signal for said latch circuit, a parallel input read signal for said shift register and an inverted signal for said change-over circuit, and a reset circuit for detecting the fixing of the level of a signal applied to said clock signal input terminal for a predetermined period of time sufficiently longer than said period of time T1 and for returning said latch circuit and said change-over circuit to the initial state.

7. An input/output device for a programmable controller, comprising:

two serial data input terminals A and B, a shift register shifted by a clock signal applied to said clock signal input terminal, a latch circuit connected to a parallel output end of said shift register, a driver for sending out in parallel an output from said latch circuit as external output signals, a receiver for receiving in parallel external input signals and applying said signals to parallel input terminals of said shift register, a change-over circuit for switching to any one of the states where a signal applied to said input terminal A is a serial input of said shift register and a serial output of said shift register is sent to said input/output terminal B, and where a signal applied to said input/output terminal B is a serial input of said shift register and a serial output of said shift register is sent to said input/output terminal A, a control circuit for detecting the fixing of the level of a signal applied to said clock signal input terminal for more than a predetermined period of time and for producing a latch signal for said latch circuit, a parallel input read signal for said shift register and an inverted signal for said change-over circuit, and a delay circuit for slightly delaying a data signal provided at any one of the serial input side and the serial output side of said shift register.

8. An input/output device for programmable controller, comprising:

two serial data input/output terminal A and B, a clock signal input terminal, a shift register of (X+1)-bit shifted only in one direction by a clock signal applied to said clock signal input terminal, a latch circuit connected to parallel output ends of X-bits other than 1 bit of said shift register, a driver for sending out in parallel an output of said latch circuit as external output signals, a receiver for receiving in parallel external input signals and applying said signals to parallel input ends of 1 to X-bits of said shift register, a circuit for applying always a high level (H) signal to an input end of (X+1)th bit of said shift register, a parity check circuit connected to parallel output ends of said shift register, a change-over circuit for switching to any one of the states where a signal applied to said input terminal A is a serial input of said shift register and a serial output of said shift register is a serial input of said shift register and a serial output of said shift register is sent to said input/output terminal A, a control circuit for detecting the fixing of the level of a signal applied to said clock signal input terminal for more than a predetermined period of time and for producing a latch signal for said latch circuit, a parallel input read signal for said shift register and an inverted signal for said change-over circuit, and an inhibiting circuit for inhibiting application of said latch signal from said control circuit to said latch circuit when an error signal is sent from said parity check circuit.

9. An input/output device for a programmable controller, comprising:

two serial data input terminals A and B, a shift register shifted by a clock signal applied to said clock signal input terminal, a latch circuit connected to a parallel output end of shift register, a driver for sending in parallel an output from said latch circuit as external output signals, a receiver for receiving in parallel external input signals and applying for receiving in parallel external input signals and applying said signals to parallel input terminals of said shift register, a change-over circuit for switching to any one of the states where a signal applied to said input terminal A is a serial input of said shift register and a serial output of said shift register is sent to said input/output terminal B, and where a signal applied to said input/output terminal B is a serial input of said shift register and a serial output of said shift register is sent to said input/output terminal A, a control circuit for detecting the fixing of the level of a signal applied to said clock signal input terminal for more than a predetermined period of time and for producing a latch signal for said latch circuit, a parallel input read signal for said shift register and an inverted signal for said change-over circuit, a counter for counting clock signals applied to said clock signal input terminal when data is shifted from said serial data input/output terminal A to B and for generating an output signal every time the counted value becomes equal to the number of shifts of said register, and a gate circuit for permitting an application of said latch signal from said control circuit to said latch circuit only when said output signal is sent from said counter.

* * * * *